United States Patent
G. Nader

(10) Patent No.: US 7,403,866 B2
(45) Date of Patent: Jul. 22, 2008

(54) HIGH-RESOLUTION, TIMER-EFFICIENT SLIDING WINDOW

(75) Inventor: M. Ali G. Nader, Malmo (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 31 days.

(21) Appl. No.: 11/222,009

(22) Filed: Sep. 8, 2005

(65) Prior Publication Data

US 2006/0085163 A1 Apr. 20, 2006

Related U.S. Application Data

(60) Provisional application No. 60/616,559, filed on Oct. 6, 2004.

(51) Int. Cl.
*G04F 10/00* (2006.01)
*G11B 27/00* (2006.01)

(52) U.S. Cl. ........................ 702/178; 714/814

(58) Field of Classification Search ................ 702/178, 702/187; 714/812, 814, 815; 707/1, 10; 709/232, 233; 370/229–235, 389, 412, 428–429
See application file for complete search history.

(56) References Cited

U.S. PATENT DOCUMENTS

| | | | |
|---|---|---|---|
| 4,095,045 A | | 6/1978 | Johnson et al. |
| 4,370,618 A | | 1/1983 | Walker |
| 5,151,591 A | | 9/1992 | Johnson et al. |
| 5,359,533 A | | 10/1994 | Ricka et al. |
| 5,995,836 A | | 11/1999 | Wijk et al. |
| 6,023,453 A | * | 2/2000 | Ruutu et al. ............... 370/229 |
| 6,098,195 A | * | 8/2000 | Northcott ................... 714/812 |
| 6,370,520 B1 | * | 4/2002 | Ruutu et al. ................ 707/1 |

(Continued)

FOREIGN PATENT DOCUMENTS

EP 0 568 771 A1 2/1993

(Continued)

OTHER PUBLICATIONS

Kim et al., Practical Network Attack Situation Analysis Using Sliding Window Cache Scheme, Sep. 21-24, 2003, The 9th Asia-Pacific Conference on Communications, vol. 3, pp. 1038-1041.*

(Continued)

*Primary Examiner*—Michael P. Nghiem
*Assistant Examiner*—Toan M. Le
(74) *Attorney, Agent, or Firm*—Potomac Patent Group PLLC

(57) ABSTRACT

Detection of whether more than a number N of events have occurred within a duration of time defined by a sliding time window includes performing an event detection procedure in response to each occurrence of an event. The event detection procedure includes associating a timestamp with the event, and determining a value, DeltaTimeStamp, based on a difference between the timestamp associated with the event and an earlier timestamp associated with an Nth previous event. The value DeltaTimeStamp is compared with a value representative of the duration of time defined by the sliding time window, and if a comparison criterion is satisfied then an events detected condition is indicated, wherein the events detected condition is defined as more than the number N of events occurring within the duration of time defined by the sliding time window.

18 Claims, 4 Drawing Sheets

U.S. PATENT DOCUMENTS

| | | | |
|---|---|---|---|
| 6,640,115 | B1 | 10/2003 | Fujimoto et al. |
| 6,687,655 | B2 * | 2/2004 | Oosthoek et al. ............ 702/186 |
| 6,697,810 | B2 * | 2/2004 | Kumar et al. ................. 707/10 |
| 6,907,426 | B2 * | 6/2005 | Hellerstein et al. ............. 707/6 |
| 2002/0174083 | A1 | 11/2002 | Hellerstein et al. |
| 2003/0014408 | A1 | 1/2003 | Robertson |

FOREIGN PATENT DOCUMENTS

| | | |
|---|---|---|
| EP | 1 085 687 A2 | 3/2001 |
| GB | 2 377 038 A | 12/2002 |

OTHER PUBLICATIONS

3GPP Technical Specification 25.304, V1.0.0, "UE Procedures in Idle Mode", Apr. 1999.

PCT International Search Report, dated Mar. 6, 2006, in connection with International Application No. PCT/EP2005/010868.

PCT Written Opinion, dated Mar. 6, 2006, in connection with International Application No. PCT/EP2005/010868.

PCT International Preliminary Examination Report, dated Feb. 2, 2007, in connection with International Application No. PCT/EP2005/010868.

* cited by examiner

HIGH-RESOLUTION, TIMER-EFFICIENT SLIDING WINDOW

CROSS REFERENCE TO RELATED APPLICATIONS

This application claims the benefit of U.S. Provisional Application No. 60/616,559, filed Oct. 6, 2004, which is hereby incorporated herein by reference in its entirety.

BACKGROUND

The present invention relates to the detection of whether a predetermined number of events have or have not occurred within a sliding time window.

In many types of systems and apparatuses, it is often desired to detect whether a predefined number of events have taken place within a certain amount of time relative to one another. Once that condition is detected, it is often also desired to detect whether a predefined number of events are no longer occurring within a certain amount of time relative to one another. Typically, in response to each of these conditions being fulfilled/not fulfilled, a corresponding change of state or certain action is invoked.

FIG. 1 is an exemplary timing diagram illustrating occurrences of some event (depicted as solid black boxes) over some period of time. In this example, it is assumed that it is desired to detect when four events take place within a certain amount of time relative to one another. That condition is satisfied within the sliding time window 101. In response to detecting that the condition is satisfied, some action, "x", is invoked 103.

FIG. 2 is an exemplary timing diagram illustrating the situation in which it is desired to detect when it is no longer the case that four events are taking place within a certain amount of time relative to one another. In this example, that situation occurs within the sliding time window 201. In response to detecting that the condition is satisfied, some action, "y", is invoked 203.

In order to avoid a trigger-happy system, a hysteresis timer is sometimes added. FIG. 3 depicts the same situation as in FIG. 2, but here it is not desired to take action "y" immediately. Rather, a hysteresis timer is added for making sure that the system is stable over some time period 301 before taking action "y". Thus, attention is focused on a sliding time window within which a certain number of events should or should not occur (depending upon what condition is being tested). To implement the hysteresis, the start and stop points of the window of time are effectively moved, and the desired condition tested, at each of the number of points within a hysteresis time period. In FIG. 3, the condition of four events not occurring within the defined window of time is true and stable over the hysteresis time period 301. Consequently, action "y" is invoked 303.

A similar hysteresis timer could be added in those situations where it is desired to detect the occurrence of a predetermined number of events within a time window. FIG. 4 illustrates the case in which it is desired to detect that four events have taken place within a certain sliding time window, and that this condition is stable during a hysteresis time period before taking action. In this example, no action is taken because the condition is not fulfilled during the hysteresis time period.

In many systems, the length of the sliding time window as well as the number of events described above are fully configurable and can be altered at any time. To take the field of telecommunications as one example, the problem of detecting the occurrence/nonoccurrence of events arises when it is necessary to detect when the block error rate at the time of reception exceeds or falls below a certain threshold within a certain sliding time window.

Another example is when one wants to solve the Hierarchical Cell Structure (HCS) problem found in 3GPP Technical Specification 25.304. In this specification, it is requested that a user equipment (UE) be able to detect whether the number of cell reselections during a time period (T) exceeds a certain preconfigured amount (N). If so, then high-mobility has been detected. In this high-mobility state, the UE shall among other things, prioritize reselection of neighboring cells on a lower HCS priority level before neighboring cells on the same HCS priority level. When the number of cell reselections during the time period (T) no longer exceeds N, the UE shall continue these measurements during a time period $T_{Hyst}$, and then revert to low-mobility measurement rules. In this example, a cell reselection is an event, T is the duration of a sliding time window within which N events must be detected, and $T_{Hyst}$ is the hysteresis timer for leaving the high-mobility state.

In order to solve problems like those mentioned above, the software solutions typically implement a sliding window as follows: The system is continuously awakened at periodic intervals by either an external program/device or by a timer that was started by the program itself. At each awakening, the sliding time window is shifted and the number of events/absence of events is counted within the sliding time window to decide whether to take an action. Additional timer supervision is required if hysteresis timers are to be used.

Such solutions have certain associated problems. For example, a system may have to constantly start timers, resulting in several timers running in parallel. Each timer timeout event results in processing to detect whether a given condition is satisfied. The faster one wants to detect whether a condition is fulfilled/not fulfilled, and the faster one wants to react and take an action, the more frequent (and finer resolution) the wake-up calls have to be. This results in more signaling, either from the external program/device or from the self-started timers, and an increased likelihood of more process switches.

SUMMARY

It should be emphasized that the terms "comprises" and "comprising", when used in this specification, are taken to specify the presence of stated features, integers, steps or components; but the use of these terms does not preclude the presence or addition of one or more other features, integers, steps, components or groups thereof.

In accordance with one aspect of the present invention, the foregoing and other objects are achieved in methods and apparatuses that detect whether more than a number N of events have occurred within a duration of time defined by a sliding time window. Detection includes performing an event detection procedure in response to each occurrence of an event. The event detection procedure includes associating a timestamp with the event, and determining a value, DeltaTimeStamp, based on a difference between the timestamp associated with the event and an earlier timestamp associated with an Nth previous event. The value DeltaTimeStamp is compared with a value representative of the duration of time defined by the sliding time window, and if a comparison criterion is satisfied then an events detected condition is indicated, wherein the events detected condition is defined as more than the number N of events occurring within the duration of time defined by the sliding time window.

In another aspect, a timer is initialized based on a difference between the value representative of the duration of time defined by the sliding time window and DeltaTimeStamp. The timer is then started, wherein a timeout event associated with the timer invokes a lack of event detection procedure that includes indicating that a lack of events condition is true, wherein the lack of events condition is defined as N or fewer events occurring within the duration of time defined by the sliding time window.

In yet another aspect, initializing the timer based on the difference between the value representative of the duration of time defined by the sliding time window and DeltaTimeStamp comprises determining the difference between the value representative of the duration of time defined by the sliding time window and DeltaTimeStamp, and combining the difference with a hysteresis value representative of a duration of time that the lack of events condition is permitted to exist before the lack of events condition is to be detected.

In still another aspect, prior to initializing the timer, it is ensured that the timer is stopped.

In some embodiments, the event is detection of a data block error in a telecommunications device.

In other embodiments, the event is a reselection of a cell in a cellular communication system. In other aspects of these embodiments, in response to the events detected condition being indicated, a user terminal is operated in a high-mobility state; and in response to the lack of events condition being indicated, the user terminal is operated in a low-mobility state.

In still other alternatives, methods and apparatuses detect whether more than a number N of events have occurred within a duration of time defined by a sliding time window. This involves, in response to each occurrence of an event, performing an event detection procedure that comprises: associating a timestamp with the event; determining a value, DeltaTimeStamp, based on a difference between the timestamp associated with the event and an earlier timestamp associated with an Nth previous event; comparing DeltaTimeStamp with a value representative of the duration of time defined by the sliding time window; determining whether a comparison criterion is satisfied. If the comparison criterion is satisfied, then a first timer is initialized based on a difference between the value representative of the duration of time defined by the sliding time window and DeltaTimeStamp, and the first timer is started. It is also determined whether a last-detected state is that the number N of events have not occurred within the duration of time defined by the sliding time window, and if so then a second timer is initialized based on a hysteresis_event value, and the second timer is started. In these embodiments, a timeout event associated with the first timer invokes a lack of event detection procedure that includes indicating that a lack of events condition has been detected, wherein the lack of events condition is defined as N or fewer events occurring within the duration of time defined by the sliding time window. Also, a timeout event associated with the second timer invokes an event detection procedure that includes indicating that an events detected condition is true, wherein the events detected condition is defined as more than the number N of events occurring within the duration of time defined by the sliding time window. Furthermore, the hysteresis_event value is representative of a duration of time that the events detected condition is permitted to exist before the events detected condition is to be detected.

In yet other aspects, the lack of event detection procedure involves determining whether a last-detected state is that the number N of events have occurred within the duration of time defined by the sliding window, and if so then determining whether the lack of events condition has existed for at least an amount of time, hyst_lack. If the lack of events condition has existed for at least an amount of time, hyst_lack, then it is indicated that the lack of events condition has been detected. Otherwise, the first timer is initialized based on the amount of time, hyst_lack, and the first timer is started.

BRIEF DESCRIPTION OF THE DRAWINGS

The objects and advantages of the invention will be understood by reading the following detailed description in conjunction with the drawings in which.

DETAILED DESCRIPTION

Figure 1:
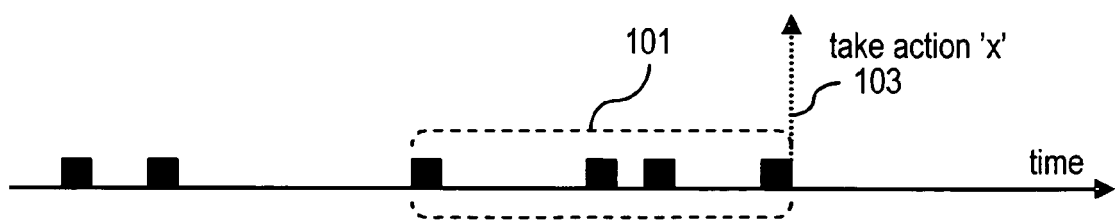
FIG. 1 is an exemplary timing diagram illustrating occurrences of some event (depicted as solid black boxes) over some period of time.

The various features of the invention will now be described with reference to the figures, in which like parts are identified with the same reference characters.

The various aspects of the invention will now be described in greater detail in connection with a number of exemplary embodiments. To facilitate an understanding of the invention, many aspects of the invention are described in terms of sequences of actions to be performed by elements of a computer system. It will be recognized that in each of the embodiments, the various actions could be performed by specialized circuits (e.g., discrete logic gates interconnected to perform a specialized function), by program instructions being executed by one or more processors, or by a combination of both. Moreover, the invention can additionally be considered to be embodied entirely within any form of computer readable carrier, such as solid-state memory, magnetic disk, optical disk or carrier wave (such as radio frequency, audio frequency or optical frequency carrier waves) containing an appropriate set of computer instructions that would cause a processor to carry out the techniques described herein. Thus, the various aspects of the invention may be embodied in many different forms, and all such forms are contemplated to be within the scope of the invention. For each of the various aspects of the invention, any such form of embodiments may be referred to herein as "logic configured to" perform a described action, or alternatively as "logic that" performs a described action.

As described in the Background section, when a conventional program wants to discover the nonoccurrence of events, it has to be informed by a program/device/timer that a predetermined amount of time has elapsed without anything happening. By contrast, an important aspect of the present invention is that the program wakes up and reacts only when an event occurs even when the program is supposed to detect a nonoccurrence of events. This enables an implementation to achieve the lowest possible reaction time and the highest possible resolution with a very simple software implementation involving fewer awakenings and a reduced amount of signaling, timer resources and process switches. These and other aspects will now be described in greater detail.

In one exemplary embodiment, assume that there is no hysteresis timer involved for detecting that the number of events exceeds a certain threshold within a predetermined period of time. Accordingly, an aspect of the invention involves a program waking up at each occurrence of an event and at that time storing a timestamp in a database (e.g., an array). Once the number of events has exceeded the preconfigured threshold (N), the time difference (DeltaTimeStamp) between the current event's timestamp and the Nth previous event's timestamp is determined. If this difference is less than or equal to the length of the sliding window of time, then it has been detected that the number of occurred events has exceeded N within the sliding window of time.

The program is now in a state where it can begin detecting the nonoccurrence of events. One aspect of detecting this condition involves starting a timer. The timer is initialized so that a timeout event will occur after a period of time corresponding to the length of the sliding time window minus the duration represented by DeltaTimeStamp. In alternative embodiments that apply a hysteresis time interval for detecting the nonoccurrence of events (hyst_lack), the timer is initialized so that a timeout event will occur after a period of time corresponding to the length of the sliding time window minus the duration represented by DeltaTimeStamp plus the duration of the desired hysteresis.

The timer gets restarted every time it is detected that the number of events has exceeded N within the predetermined period of time. If the timer ever times out, this indicates that N or fewer events occurred within a predetermined period of time (i.e., the lack of events has been detected).

Figure 5:
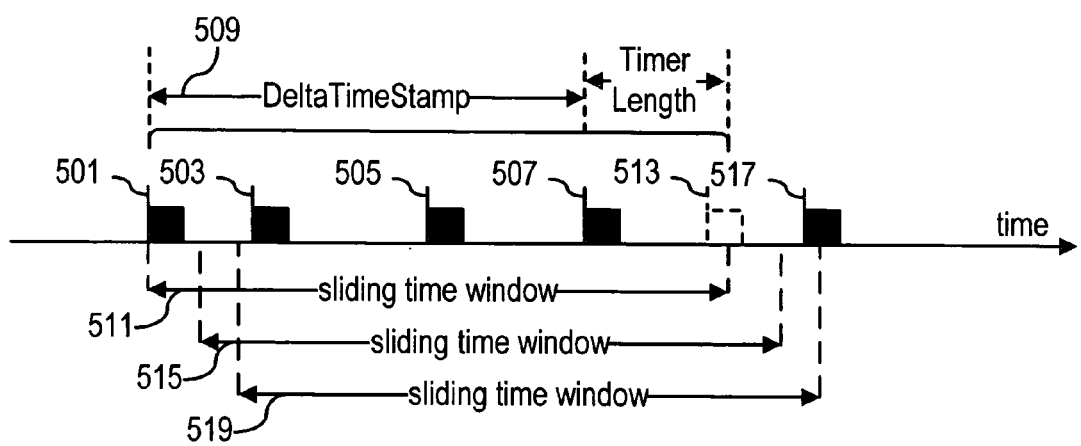
FIG. 5 is a timing diagram that illustrates the operation of an exemplary embodiment.

FIG. 5 is a timing diagram that illustrates the operation of the exemplary embodiment described above. In this example, a series of events occur that are variously spaced with respect to one another. Assume that the preconfigured threshold, N, is equal to 3, and that no other events have occurred prior to the events depicted in the figure. Further assume that timestamps represent the first moment in time when an event occurs (i.e., the leading edges of the various events depicted in FIG. 5).

When event 501 occurs, the total number of events (i.e. at this point only one) does not exceed the threshold N, so the only action taken is determining the timestamp and saving it in a suitable database. The same is true for the next two events 503 and 505.

When a fourth event 507 occurs, the threshold value of 3 is exceeded, so in addition to determining and storing a timestamp associated with the fourth event 507, the timestamp associated with the first event 501 is subtracted from the timestamp associated with the fourth event 507 to generate a value for DeltaTimeStamp 509. In this example, DeltaTimeStamp 509 is less than the duration of the sliding time window 511, so the detection of more than 3 events within a period of time defined by the sliding time window 511 has occurred.

In order to detect whether the condition of more than 3 events occurring within a span defined by the sliding time window ceases to be satisfied, a timer length is determined by subtracting the DeltaTimeStamp value from the length of the sliding time window 511. A timer is initialized to this value and invoked.

If a next event 513 were to occur before expiration of the timer, a new value of DeltaTimeStamp would be computed as the difference between the timestamp associated with the event 513 and the timestamp associated with the event 503, the timer would be reinitialized with a new timer length value, and restarted. This is because the new DeltaTimeStamp value is again less than the length of the sliding time window 511.

However, if the event 513 does not occur (indicated by the dotted lines in FIG. 5), then the timer will cause a timeout event, which signifies that the condition of more than 3 events occurring within a time span defined by a sliding time window is no longer satisfied. This is illustrated in the figure by the sliding time window 515, which defines a period of time associated with only three events 503, 505, and 507.

When a next event 517 occurs, the events detected condition is again satisfied because the DeltaTimeStamp value determined as the difference between the timestamp associated with the event 517 and the timestamp associated with the event 503 is less than the duration of the sliding time window 519.

In considering situations such as the one depicted in FIG. 5, the designer may not want to consider the relatively short interval of time between the conclusion of the sliding time window 511 and the beginning of event 517 to be an instance in which the events detected condition is no longer satisfied. As mentioned earlier, to prevent the system from responding in this manner, a hysteresis value (hyst_lack) may be added when determining a value for the timer length. The value of hyst_lack may be selected such that the timer will not cause a timeout event to occur before an event such as the event 517 has had a chance to occur.

Figure 6:
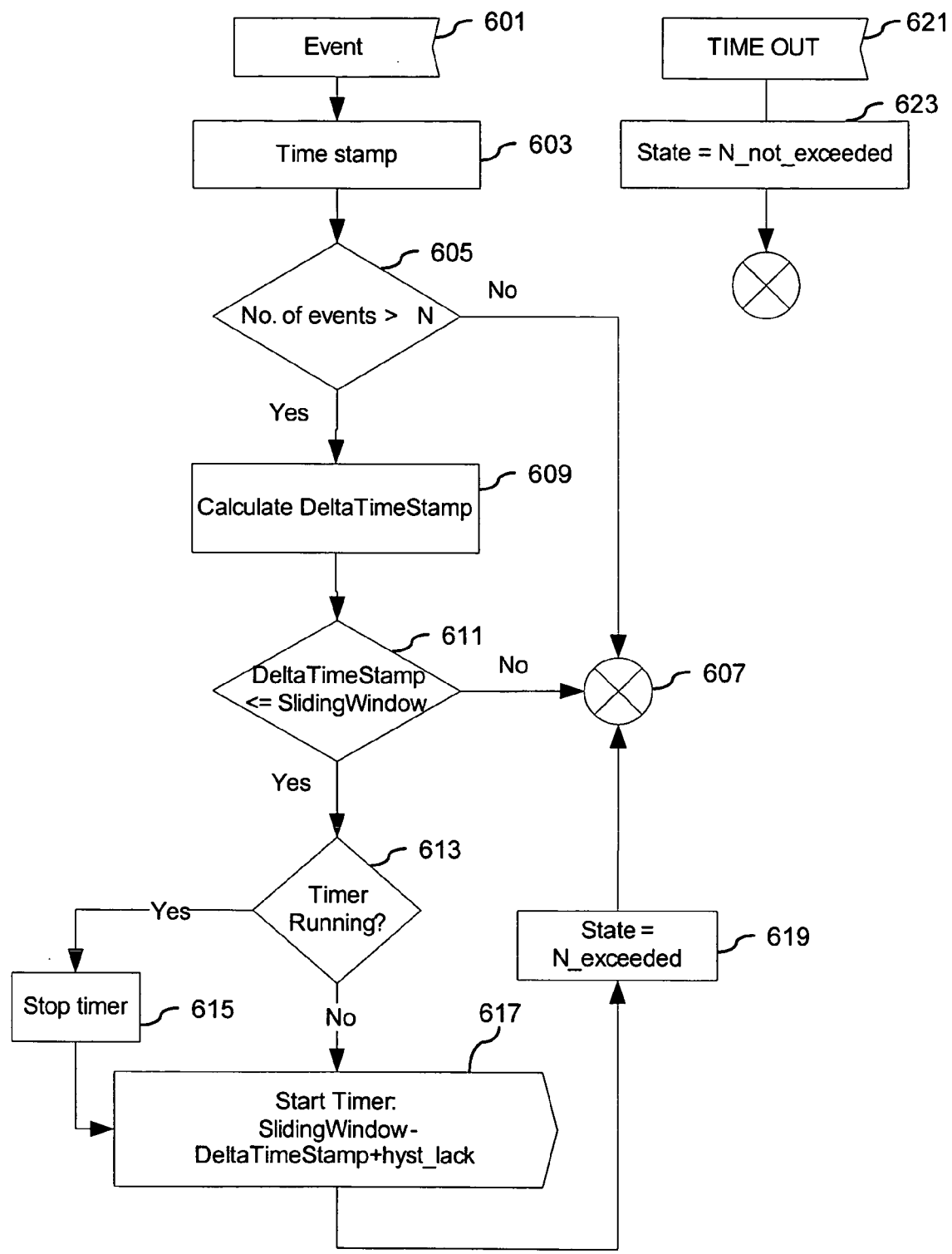
FIG. 6 is a flowchart depicting an exemplary implementation of an embodiment.

FIG. 6 is a flowchart depicting an exemplary implementation of the embodiment just described. The exemplary embodiment begins with the occurrence of an event (step 601). In response to the event 601, a corresponding timestamp is determined and stored in a suitable database (step 603). The total number of events encountered is then compared with a predefined threshold value, N (decision block 605). If a comparison criterion is not satisfied (e.g., if the total number of events is not greater than the threshold value, N) ("NO" path out of decision block 605), then this invocation of the routine terminates (step 607).

If, however, the comparison criterion is satisfied ("YES" path out of decision block 605), then the value DeltaTimeStamp is determined as the difference between the most recently determined timestamp and the Nth previous event's timestamp (step 609).

The value of DeltaTimeStamp is then compared with the length of the sliding time window (decision block 611). If a comparison criterion is not satisfied (e.g., if DeltaTimeStamp is not less than or equal to the length of the sliding time window) ("NO" path out of decision block 611), then this invocation of the routine terminates (step 607).

If, however, the comparison criterion is satisfied ("YES" path out of decision block 611), then the routine goes on to determine whether a timer is presently running (decision block 613). If it is ("YES" path out of decision block 613), then the timer is stopped (step 615) and processing continues at step 617. If no timer was already running ("NO" path out of decision block 613), then processing continues directly to step 617. It will be noted that the steps 613 and 615 are illustrated here for somewhat pedagogical reasons, that is, to very clearly point out that an already-running timer should be stopped. It will be recognized, however, that in alternative embodiments the designer may find it more expedient to skip the test exemplified by decision block 613, and instead to simply issue a "timer stop" command, which is simply ignored if the timer is already stopped. In these and other equivalent embodiments, the purpose of these steps is to ensure that the timer is stopped, so that it may be restarted with a new initialization value. If timer logic is used that permits a new initial value to be loaded without actually stopping the timer, then the step of ensuring that the timer is stopped does not involve any actual action.

At step 617, the timer is (re-)initialized with a value corresponding to the difference between the length of the sliding time window and the value of DeltaTimeStamp. If a hysteresis (hyst_lack) is to be used for detecting lack of events, then this value is added to the value with which the timer is initialized. After (re-)initialization, the timer is started. A variable representing the present state of processing is set to a value that indicates that the number of events encountered satisfies the indicated criterion (e.g., it exceeds the threshold value N) (step 619). This invocation of the routine then terminates (step 607).

The steps described above are performed in response to each occurrence of the event under consideration. If a timeout event occurs (step 621), this indicates that the criterion specifying the number of events that should take place within the duration of a sliding time window is no longer satisfied (i.e., a lack of events has been detected). Accordingly, the variable representing the present state of processing is set to a value that indicates the failure to satisfy this criterion.

In order to facilitate an understanding of the various inventive aspects, the exemplary embodiment depicted in FIG. 6 focuses on the state changes between "N_exceeded" and "N_not_exceeded". However, it will be appreciated that in embodiments in which one or more actions are to be triggered off of one or both of these state changes, the embodiment depicted in FIG. 6 may have to be modified. In particular, the logic depicted in FIG. 6 permits the step "State=N_exceeded" (step 619) to be executed two or more times in succession for however long the condition continues to be true after first transitioning to this state. If setting the state is the trigger for performing the action, then the action may be undesirably performed more than once. Accordingly, under these expected operating conditions, it may be desirable to add additional logic to prevent this from happening. For example, after step 617 but before step 619, an additional test can be added to determine whether the state is already set equal to "N_exceeded", and if so, then to skip execution of step 619. In one or more other alternative embodiments, flags can be added to inform the action-triggering-logic (not shown) when the state has actually changed (e.g., from "N_not_exceeded" to "N_exceeded"), and this indication of change can then serve as the trigger for taking the desired action.

Figure 7A:
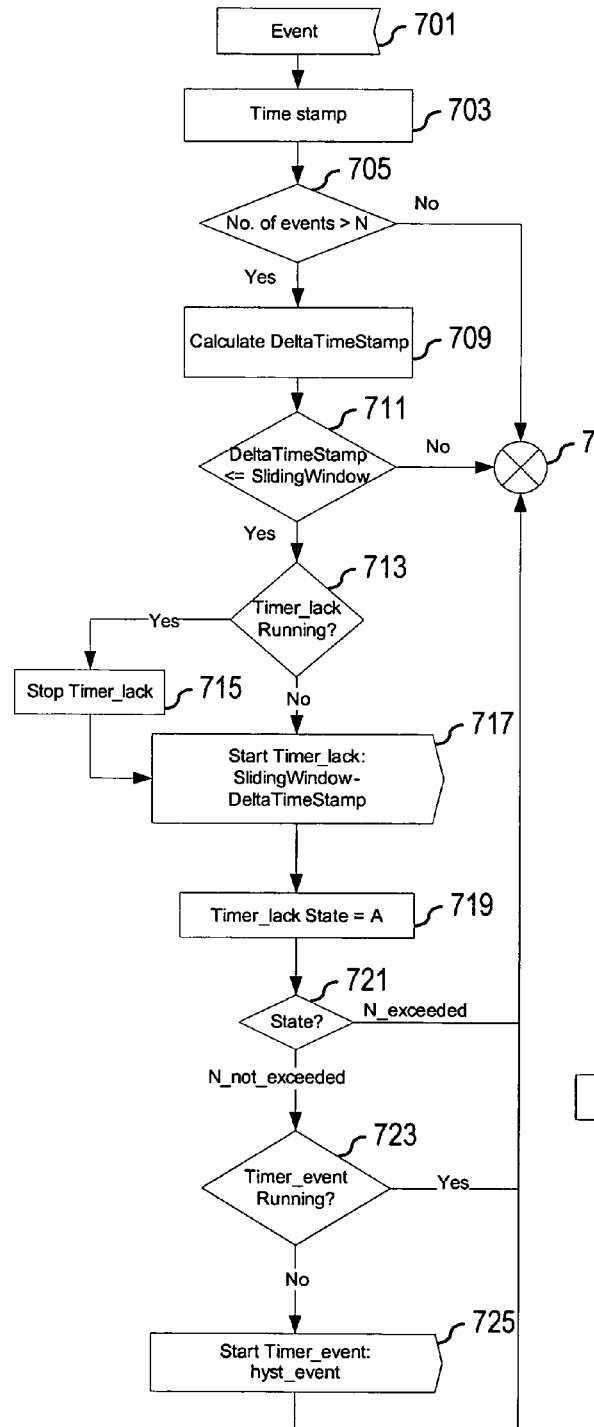
FIGS. 7A, 7B, and 7C are flowcharts depicting an alternative exemplary implementation of an embodiment.
Figure 7B:
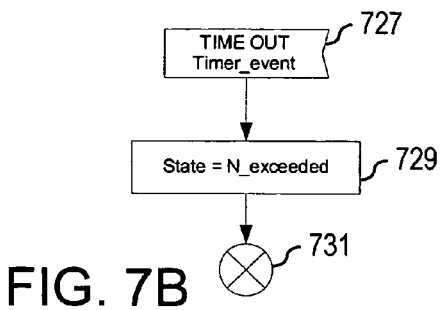
Figure 7C:
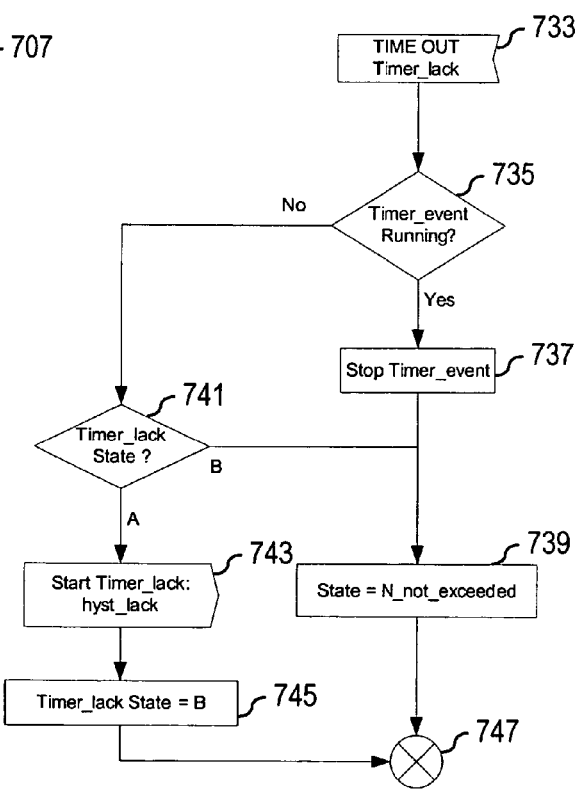

FIGS. 7A, 7B, and 7C are flowcharts that together depict an alternative exemplary implementation of an embodiment consistent with the invention. In this embodiment, it is assumed that there is a hysteresis timer (Timer_event) involved for detecting that the number of events within a sliding window of time exceeds N. Here, two timers are used: one timer (Timer_lack) that is started when detecting that the number of occurred events within the sliding window of time has exceeded N as described above, and another timer (Timer_event) that is started the first time it is detected that the current state is "N_not_exceeded" and the number of incoming events within the sliding window of time exceeds N. In an alternative of this embodiment, one could optimize by not starting the Timer_event timer if (SlidingWindowLength−DeltaTimeStamp)>=hyst_event. This is based on the inventor's observation that if the present state is N_not_exceeded and more than N events occur very close to one another, then there is no point in starting the Timer_event timer if the sliding window length is bigger than the duration of hyst_event.

If the Timer_event timer times out before the Timer_lack timer, then it is known that the number of events has been exceeding N for a period of time corresponding to the sliding window extended by a hysteresis time (hyst_event), and proper action can then be taken. If the Timer_lack timer times out before the Timer_event timer, then this indicates detection of the lack of a sufficient number of events during the sliding window (extended by a duration, hyst_lack, if hysteresis was used here as well).

Referring first to FIG. 7A, the exemplary embodiment begins with the occurrence of an event (step 701). In response to the event 701, a corresponding timestamp is determined and stored in a suitable database (step 703). The total number of events encountered is then compared with a predefined threshold value, N (decision block 705). If a comparison criterion is not satisfied (e.g., if the total number of events is not greater than the threshold value, N) ("NO" path out of decision block 705), then this invocation of the routine terminates (step 707).

If, however, the comparison criterion is satisfied ("YES" path out of decision block 705), then the value DeltaTimeStamp is determined as the difference between the most recently determined timestamp and the Nth previous event's timestamp (step 709).

The value of DeltaTimeStamp is then compared with the length of the sliding time window (decision block 711). If a comparison criterion is satisfied ("YES" path out of decision block 711), then the routine goes on to determine whether the Timer_lack timer is presently running (decision block 713). If it is ("YES" path out of decision block 713), then the Timer_lack timer is stopped (step 715) and processing continues at step 717. If the Timer_lack timer was not already running ("NO" path out of decision block 713), then processing continues directly to step 717. It will be noted that the steps 713 and 715 are illustrated here for somewhat pedagogical reasons, that is, to very clearly point out that an already-running timer should be stopped. It will be recognized, however, that in alternative embodiments the designer may find it more expedient to skip the test exemplified by decision block 713, and instead to simply issue a "timer stop" command, which is simply ignored if the timer is already stopped. In these and other equivalent embodiments, the purpose of these steps is to ensure that the timer is stopped, so that it may be restarted with a new initialization value. If timer logic is used that permits a new initial value to be loaded without actually stopping the timer, then the step of ensuring that the timer is stopped does not involve any actual action.

At step 717, the timer is (re-)initialized with a value corresponding to the difference between the length of the sliding time window and the value of DeltaTimeStamp. After (re-)initialization, the timer is started. Unlike the embodiment depicted in FIG. 6, the variable representing the present state of processing is not yet set to a value that indicates that the number of events encountered within the sliding window satisfies the indicated criterion (e.g., it exceeds the threshold value N). The reason is because, in order to incorporate the desired hysteresis, this is performed (step 729) only after another timer (Timer_event) causes a timeout event (step 729).

It is additionally preferred to avoid having the Timer_event timer timeout multiple times in succession without any intervening change of state to "N_not_exceeded". Accordingly, following the performance of step 717, a number of steps are performed to ensure that timeout events do not cause the state to flip-flop from one state to another without the appropriate hysteresis time period passing. More particularly, a variable, herein called "Timer_lack State" is set equal to a first value ("A"), which may later be tested in the event of a Timer_lack timeout event.

Next, the existing state is tested (decision block 721). If the present state is "N_exceeded", then this invocation of the routine terminates (step 707). The rationale here is that it is unnecessary to start the Timer_event timer because the state that that timer's timeout event would detect has already been detected.

If, however, the present state detected by decision block 721 is "N_not_exceeded", then it is next detected whether the Timer_event timer is already running (decision block 723). If yes, then this invocation of the routine terminates (step 707). This ensures that the Timer_event timer will eventually timeout if this path through the logic continues to be taken.

If the timer_event timer is not already running ("NO" path out of decision block 723), then the Timer_event timer is started (step 725) with a timeout event interval programmed to be equal to the desired hysteresis time interval (hyst_event). This invocation of the routine then terminates (step 707).

The exemplary logic presented in FIG. 7A shows how one or both of the timers can be initialized and started. The next issue to deal with is what happens when one of them causes a timeout event. Referring first to FIG. 7B, if the Timer_event timer times out (step 727), this means that the criterion specifying the number of events that should take place within the duration of a sliding time window has been satisfied (i.e., the desired number of events have been detected within the time window). Accordingly, the variable representing the present state of processing is set to a value that indicates that this criterion has been satisfied (step 729). The routine then terminates (step 731).

Alternatively, if the Timer_lack timer causes a timeout event (step 733), additional testing must be performed to determine whether the criterion specifying the number of events that should take place within the duration of a sliding time window is no longer satisfied (i.e., a lack of events has been detected) and continuing to be true for at least the associated hysteresis time period (hyst_lack). Accordingly, a test is performed to determine whether the Timer_event timer is running (decision block 735). If it is ("YES" path out of decision block 735), then the Timer_event timer is stopped (step 737) in order to prevent it from subsequently causing its own timeout event which could cause the state to erroneously change to "N_exceeded". The state is then changed to "N_not_exceeded" (step 739), and the Timer_lack timeout event routine terminates (step 747).

Returning to decision block 735, if it is determined that the Timer_event timer is not running ("NO" path out of decision block 735), then the Timer_lack state variable is tested (decision block 741) to further determine what state is indicated by this timeout event. That is, in this embodiment the Timer_lack timer is initialized with one of two variables. If initialization was last performed in the "main" routine depicted in FIG. 7A (see step 717), this is indicated by the Timer_lack State variable being set to value "A", and this timeout event indicates that the instantaneous state (i.e., without waiting for the hysteresis time period) is "N_not_exceeded". If this is the case ("A" path out of decision block 741), then the Timer_lack timer is re-initialized, this time to timeout after the associated hysteresis time period, hyst_lack (step 743). The Timer_lack State variable is also now set to a second value (e.g., "B")

(step 745) to indicate that a next Timer_lack timeout event that occurs without an intervening execution of the "main" routine depicted in FIG. 7A indicates expiration of the associated hysteresis time period, hyst_lack. Execution of the timeout routine then terminates (step 747).

It will now be understood that, if it is determined at decision block 741 that the Timer_lack State variable is equal to "B", then this indicates that that N_not_exceeded state has existed for at least the hysteresis time period. Accordingly, execution proceeds to step 739, where the State is set equal to "N_not_exceeded". Execution of the timeout routine then terminates (step 747).

It should be understood that the details that make up the exemplary embodiment of FIGS. 7A, 7B, and 7C should not be considered as limiting of the invention. To the contrary, many other embodiments can be derived from the same principles employed in this embodiment. These principles include, in response to each occurrence of an event, determining whether the time span between a most-recent event and an Nth previous event is within the duration of a sliding window, and if so, then starting a first timer (e.g., Timer_lack timer) initialized to timeout at a point in time that, if no further events happen, would be indicative that the N_exceeded condition is no longer being satisfied.

Further, a second timer (e.g., Timer_event) is initialized to timeout at a point in time that indicates that the desired hysteresis time period for detecting satisfaction of the N_exceeded condition has elapsed.

Once the two timers are started, detected state changes are based on which of the two timers times out first. So long as the N_exceeded condition continues to be true (i.e., events keep happening within a short enough interval relative to one another), the first timer (e.g., Timer_lack timer) is re-initialized, so that its timeout is prevented. The second timer (e.g., Timer_event) would therefore be the first to expire. However, if the interval between events becomes long enough such that the N_exceeded condition is no longer true, then the first timer (e.g., Timer_lack timer) will be the first to expire. The timer_lack procedure that is invoked as a result of this timeout event can stop the second timer (e.g., Timer_event), thereby preventing its timeout from happening. A hysteresis time interval can be built into detection of the "N_not_exceeded" condition as well by requiring two timeout events of the first timer to occur in succession (i.e., without any intervening timeout event from the second timer), the first timeout event occurring after the "N_not_exceeded" condition becomes true, and the second timeout event occurring after the desired hysteresis period.

It should be apparent that the various embodiments described herein provide advantages over conventional techniques. For example, a program whose purpose is to detect whether the event condition has been satisfied does not need to be awakened as frequently as those utilized in conventional solutions. As a consequence, there will be less signaling and possibly fewer process switches.

Figure 2:
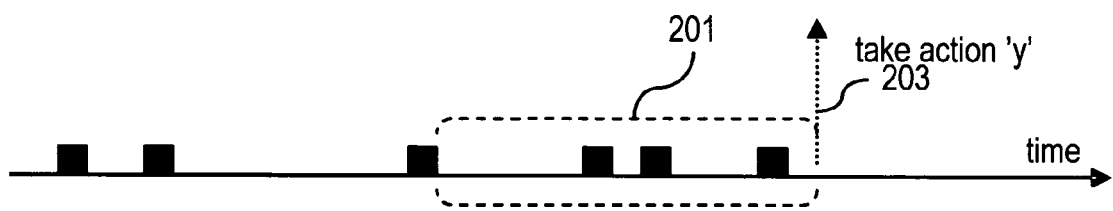
FIG. 2 is an exemplary timing diagram illustrating the situation in which it is desired to detect when it is no longer the case that four events are taking place within a certain amount of time relative to one another.
Figure 3:
FIG. 3 is an exemplary timing diagram illustrating the situation in which it is desired to detect when, over a hysteresis time period, it is no longer the case that four events are taking place within a certain amount of time relative to one another.
Figure 4:
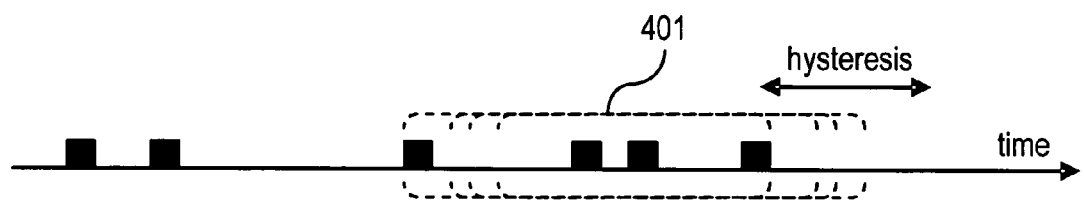
FIG. 4 illustrates the case in which it is desired to detect when four events have taken place within a certain amount of time during a hysteresis time period before taking action, but in which no action is taken because the condition is not fulfilled during the hysteresis time period.

In all cases with combinations of the examples presented in FIGS. 1-3, only one timer resource is needed. Even in the most complicated scenarios in which hysteresis timers would be needed for detecting both events and lack of events (i.e., combinations of examples depicted in FIGS. 1-4), a maximum of only two timer resources are needed.

Moreover, the various embodiments give a very high resolution coupled with a very low reaction time.

The invention has been described with reference to particular embodiments. However, it will be readily apparent to those skilled in the art that it is possible to embody the invention in specific forms other than those of the embodiment described above. The described embodiments are merely illustrative and should not be considered restrictive in any way. The scope of the invention is given by the appended claims, rather than the preceding description, and all variations and equivalents which fall within the range of the claims are intended to be embraced therein.

What is claimed is:

1. A method of operating an apparatus to detect whether an event signal has been asserted more than N times within a duration of time defined by a sliding time window, the method comprising:

in response to each assertion of the event signal, performing an event detection procedure that comprises:

associating a timestamp with the assertion of the event signal;

determining a value, DeltaTimeStamp, based on a difference between the timestamp associated with the assertion of the event signal and an earlier timestamp associated with an Nth previous assertion of the event signal; and comparing DeltaTimeStamp with a value representative of the duration of time defined by the sliding time window, and if a comparison criterion is satisfied then indicating that an events detected condition is true, wherein the events detected condition is defined as more than N assertions of the event signal occurring within the duration of time defined by the sliding time window.

2. The method of claim 1, comprising:

initializing a timer based on a difference between the value representative of the duration of time defined by the sliding time window and DeltaTimeStamp; and starting the timer, wherein a timeout event associated with the timer invokes a lack of event detection procedure that includes indicating that a lack of events condition is true, wherein the lack of events condition is defined as N or fewer assertions of the event signal occurring within the duration of time defined by the sliding time window.

3. The method of claim 2, wherein initializing the timer based on the difference between the value representative of the duration of time defined by the sliding time window and DeltaTimeStamp comprises:

determining the difference between the value representative of the duration of time defined by the sliding time window and DeltaTimeStamp, and combining the difference with a hysteresis value representative of a duration of time that the lack of events condition is permitted to exist before the lack of events condition is to be detected.

4. The method of claim 2, comprising:

prior to initializing the timer, ensuring that the timer is stopped.

5. A method of detecting whether more than a number N of events have occurred within a duration of time defined by a sliding time window, the method comprising:

in response to each occurrence of an event, performing an event detection procedure that comprises:

associating a timestamp with the event;

determining a value, DeltaTimeStamp, based on a difference between the timestamp associated with the event and an earlier timestamp associated with an Nth previous event;

comparing DeltaTimeStamp with a value representative of the duration of time defined by the sliding time window, and if a comparison criterion is satisfied then indicating that an events detected condition is true, wherein the events detected condition is defined as more than the number N of events occurring within the duration of time defined by the sliding time window;

initializing a timer based on a difference between the value representative of the duration of time defined by the sliding time window and DeltaTimeStamp; and starting the timer, wherein a timeout event associated with the timer invokes a lack of event detection procedure that includes indicating that a lack of events condition is true, wherein the lack of events condition is defined as N or fewer events occurring within the duration of time defined by the sliding time window, and wherein the event is detection of a data block error in a telecommunications device.

6. A method of detecting whether more than a number N of events have occurred within a duration of time defined by a sliding time window, the method comprising:

in response to each occurrence of an event, performing an event detection procedure that comprises:

associating a timestamp with the event;

determining a value, DeltaTimeStamp, based on a difference between the timestamp associated with the event and an earlier timestamp associated with an Nth previous event;

comparing DeltaTimeStamp with a value representative of the duration of time defined by the sliding time window, and if a comparison criterion is satisfied then indicating that an events detected condition is true, wherein the events detected condition is defined as more than the number N of events occurring within the duration of time defined by the sliding time window;

initializing a timer based on a difference between the value representative of the duration of time defined by the sliding time window and DeltaTimeStamp; and starting the timer, wherein a timeout event associated with the timer invokes a lack of event detection procedure that includes indicating that a lack of events condition is true, wherein the lack of events condition is defined as N or fewer events occurring within the duration of time defined by the sliding time window, and wherein the event is a reselection of a cell in a cellular communication system.

7. The method of claim 6, comprising:

in response to the events detected condition being indicated, operating a user terminal in a high-mobility state; and in response to the lack of events condition being indicated, operating the user terminal in a low-mobility state.

8. A method of operating an apparatus to detect whether an event signal has been asserted more than N times within a duration of time defined by a sliding time window, the method comprising:

in response to each assertion of the event signal, performing an event detection procedure that comprises:

associating a timestamp with the assertion of the event signal;

determining a value, DeltaTimeStamp, based on a difference between the timestamp associated with the assertion of the event signal and an earlier timestamp associated with an Nth previous assertion of the event signal;

comparing DeltaTimeStamp with a value representative of the duration of time defined by the sliding time window;

determining whether a comparison criterion is satisfied, and if so then performing:

initializing a first timer based on a difference between the value representative of the duration of time defined by the sliding time window and Delta-TimeStamp;

starting the first timer; and determining whether a last-detected state is that N assertions of the event signal have not occurred within the duration of time defined by the sliding time window, and if so then performing:

initializing a second timer based on a hysteresis_event value; and starting the second timer, wherein a timeout event associated with the first timer invokes a lack of event detection procedure that includes indicating that a lack of events condition has been detected, wherein the lack of events condition is defined as N or fewer assertions of the event signal occurring within the duration of time defined by the sliding time window, wherein a timeout event associated with the second timer invokes an event detection procedure that includes indicating that an events detected condition is true, wherein the events detected condition is defined as more than N assertions of the event signal occurring within the duration of time defined by the sliding time window, and wherein the hysteresis_event value is representative of a duration of time that the events detected condition is permitted to exist before the events detected condition is to be detected.

9. The method of claim 8, wherein the lack of event detection procedure comprises:

determining whether a last-detected state is that N assertions of the event signal have occurred within the duration of time defined by the sliding window, and if so then performing:

determining whether the lack of events condition has existed for at least an amount of time, hyst_lack, and if so then indicating that the lack of events condition has been detected, and if not then performing:

initializing the first timer based on the amount of time, hyst_lack; and starting the first timer.

10. An apparatus for detecting whether an event signal has been asserted more than N times within a duration of time defined by a sliding time window, the apparatus comprising:

logic that responds to each assertion of the event signal by performing an event detection procedure that comprises:

associating a timestamp with the assertion of the event signal;

determining a value, DeltaTimeStamp, based on a difference between the timestamp associated with the assertion of the event signal and an earlier timestamp associated with an Nth previous assertion of the event signal; and comparing DeltaTimeStamp with a value representative of the duration of time defined by the sliding time window, and if a comparison criterion is satisfied then indicating that an events detected condition is true, wherein the events detected condition is defined as more than N assertions of the event signal occurring within the duration of time defined by the sliding time window.

11. The apparatus of claim 10, comprising:

logic that initializes a timer based on a difference between the value representative of the duration of time defined by the sliding time window and DeltaTimeStamp; and logic that starts the timer, wherein a timeout event associated with the timer invokes lack of event detection logic that includes logic that indicates that a lack of events condition is true, wherein the lack of events condition is defined as N or fewer assertions of the event signal occurring within the duration of time defined by the sliding time window.

12. The apparatus of claim 11, wherein the logic that initializes the timer based on the difference between the value representative of the duration of time defined by the sliding time window and DeltaTimeStamp comprises:

logic that determines the difference between the value representative of the duration of time defined by the sliding time window and DeltaTimeStamp, and combines the difference with a hysteresis value representative of a duration of time that the lack of events condition is permitted to exist before the lack of events condition is to be detected.

13. The apparatus of claim 11, comprising:

logic that ensures that the timer is stopped prior to initializing the timer.

14. An apparatus for detecting whether more than a number N of events have occurred within a duration of time defined by a sliding time window, the apparatus comprising:

logic that responds to each occurrence of an event by performing an event detection procedure that comprises:

associating a timestamp with the event;

determining a value, DeltaTimeStamp, based on a difference between the timestamp associated with the event and an earlier timestamp associated with an Nth previous event;

comparing DeltaTimeStamp with a value representative of the duration of time defined by the sliding time window, and if a comparison criterion is satisfied then indicating that an events detected condition is true, wherein the events detected condition is defined as more than the number N of events occurring within the duration of time defined by the sliding time window;

logic that initializes a timer based on a difference between the value representative of the duration of time defined by the sliding time window and DeltaTimeStamp; and logic that starts the timer, wherein a timeout event associated with the timer invokes lack of event detection logic that includes logic that indicates that a lack of events condition is true, wherein the lack of events condition is defined as N or fewer events occurring within the duration of time defined by the sliding time window, and wherein the event is detection of a data block error in a telecommunications device.

15. An apparatus for detecting whether more than a number N of events have occurred within a duration of time defined by a sliding time window, the apparatus comprising:

logic that responds to each occurrence of an event by performing an event detection procedure that comprises:

associating a timestamp with the event;

determining a value, DeltaTimeStamp, based on a difference between the timestamp associated with the event and an earlier timestamp associated with an Nth previous event;

comparing DeltaTimeStamp with a value representative of the duration of time defined by the sliding time window, and if a comparison criterion is satisfied then indicating that an events detected condition is true, wherein the events detected condition is defined as more than the number N of events occurring within the duration of time defined by the sliding time window;

logic that initializes a timer based on a difference between the value representative of the duration of time defined by the sliding time window and DeltaTimeStamp; and logic that starts the timer, wherein a timeout event associated with the timer invokes lack of event detection logic that includes logic that indicates that a lack of events condition is true, wherein the lack of events condition is defined as N or fewer events occurring within the duration of time defined by the sliding time window, and wherein the event is a reselection of a cell in a cellular communication system.

16. The apparatus of claim 15, comprising:

logic that operates a user terminal in a high-mobility state in response to the events detected condition being indicated; and logic that operates the user terminal in a low-mobility state in response to the lack of events condition being indicated.

17. An apparatus for detecting whether an event signal has been asserted more than N times within a duration of time defined by a sliding time window, the apparatus comprising:

logic that responds to each assertion of the event signal by performing an event detection procedure that comprises:

associating a timestamp with the assertion of the event signal;

determining a value, DeltaTimeStamp, based on a difference between the timestamp associated with the assertion of the event signal and an earlier timestamp associated with an Nth previous assertion of the event signal;

comparing DeltaTimeStamp with a value representative of the duration of time defined by the sliding time window;

determining whether a comparison criterion is satisfied, and if so then performing:

initializing a first timer based on a difference between the value representative of the duration of time defined by the sliding time window and DeltaTimeStamp;

starting the first timer; and determining whether a last-detected state is that N assertions of the event signal have not occurred within the duration of time defined by the sliding time window, and if so then performing:

initializing a second timer based on a hysteresis_event value; and starting the second timer, wherein a timeout event associated with the first timer invokes a lack of event detection procedure that includes indicating that a lack of events condition has been detected, wherein the lack of events condition is defined as N or fewer assertions of the event signal occurring within the duration of time defined by the sliding time window, wherein a timeout event associated with the second timer invokes an event detection procedure that includes indicating that an events detected condition is true, wherein the events detected condition is defined as more than N assertions of the event signal occurring within the duration of time defined by the sliding time window, and wherein the hysteresis_event value is representative of a duration of time that the events detected condition is permitted to exist before the events detected condition is to be detected.

18. The apparatus of claim 17, wherein the lack of event detection procedure comprises:

determining whether a last-detected state is that N assertions of the event signal have occurred within the duration of time defined by the sliding window, and if so then performing:

determining whether the lack of events condition has existed for at least an amount of time, hyst_lack, and if so then indicating that the lack of events condition has been detected, and if not then performing:

initializing the first timer based on the amount of time, hyst_lack; and starting the first timer.

* * * * *